Figure 1:
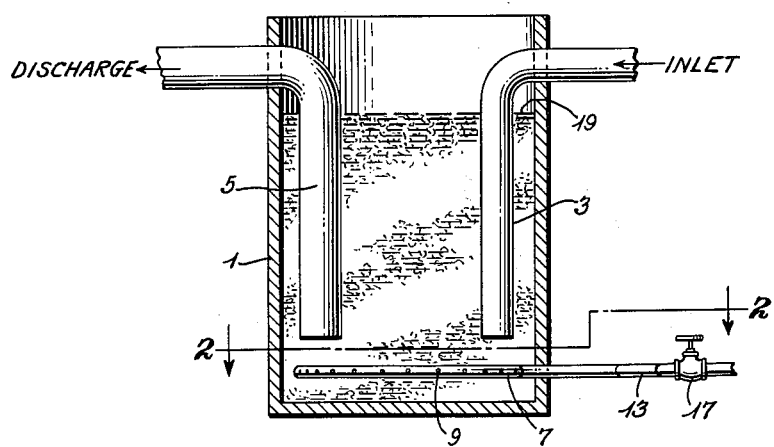

June 5, 1962   J. T. GAYHARDT   3,037,931
DISPOSAL OF WASTE STARCH-CONTAINING RESIDUES
Filed June 12, 1957

INVENTOR
Joseph T. Gayhardt

BY Stevens, Davis, Miller & Mosher
ATTORNEYS

United States Patent Office 3,037,931
Patented June 5, 1962

3,037,931
DISPOSAL OF WASTE STARCH-CONTAINING RESIDUES
Joseph T. Gayhardt, 1900 Swansea Road, Baltimore 14, Md.
Filed June 12, 1957, Ser. No. 665,158
10 Claims. (Cl. 210—58)

This invention relates to a method and composition for disposing of wastes derived from starch compositions employed as adhesives in certain industries, with particular reference to the corrugated board and box industries.

In many industries it is conventional practice to employ various starch compositions for adhesive purposes, and among these may be mentioned the corrugated board and box industries where starch compositions are employed for sealing or laminating two or more pieces or plies of corrugated board or box components together during the course of their manufacture. These components may be paper, cardboard, plywood, etc. The waste starch residues that result from the manufacturing operations in these industries pose serious problems of waste control and disposal due to the physical and chemical characteristics of the starch adhesive refuse materials.

Normally this starch refuse material is directed into a pit or tank from the corrugators or other starch composition utilizing apparatus, together with an indeterminate amount of flushing water, grease, oil and/or other liquid debris. On standing, this material becomes compacted and doughy or sludgelike in consistency with concomitant microbial and bacterial action, resulting in odors of decay rendering its removal problem even more difficult.

Since many municipalities have imposed severe restrictions upon the dumping of such malodorous and otherwise objectionable waste materials into streams, it is frequently impossible to dispose of this waste residue in such fashion. Moreover, even where the plant may be in a relatively isolated location with perhaps few, if any, legal restrictions upon the method of disposal of the, waste, nevertheless to attempt to dispose of the waste in such manner still gives rise to serious problems. Heretofore, removal of this waste residue was effected periodically such as approximately every month by means of manual excavation from the pit or tank, transfer of the refuse to an isolated area, and burial of same. This, however, entails considerable expense in terms of labor costs, the procurement of permits from municipal authorities, and general inconvenience to all concerned.

It is therefore an object of the present invention to provide a process and composition for handling waste materials resulting from the use of various starch formulations as adhesives in industries such as the corrugated board and box industries. It is a further object of the invention to provide a process and composition for enabling the plant operator to dispose of these waste residues in a simple and convenient fashion, and particularly in a fashion that will result not only in substantial savings in labor and other costs, but also with a minimum of nuisance to neighboring persons and facilities.

The manner in which these and other objects of the invention are attained will become apparent from the following description, which is intended to be illustrative rather than limitative.

According to the present invention, it has been discovered that it is possible to bring about suspension or solubilization of these starch composition waste residues, thereby enabling the plant operator readily to provide for a normal discharge of the waste material into the plant sewage system on a day-by-day basis according to the prevailing production cycle, with obvious savings and economies resulting in a more efficient operation of the plant and also—and by no means least important—rendering much more attractive to ultimate users the use of starch compositions as an adhesive material.

More particularly, it has been discovered in accordance with the present invention that this waste material may be very conveniently removed from the plant via the normal sewage outlets without the formation of accumulations or obstructions. In other words, the waste starch residue, treated in the manner about to be described, may be flowed, discharged or pumped into such a sewage system without difficulty and in accordance with the normal requirements of the plant to which the waste disposal system of the present invention is appurtenant, and without difficulties arising due to corrosion or blockage.

In order to bring about the results thus described, and simultaneously to achieve the objects contemplated by the invention, it has been discovered that by introducing into the starch adhesive composition waste residues a chemical agent, at a rate dependent upon the flow rate of the waste and the solids content thereof, so as to have in the system the proper ratio of refuse and chemical agent sufficient to convert the waste material components into a solution or dispersion, the resulting mixture becomes one which is very convenient and easy to dispose of. The chemical agent or additive may conveniently be added to a treatment tank where it contacts the waste either continuously or intermittently, as desired. For example, the chemical agent may be added in the required amount, say, once during every 24 hours of the operational cycle. The ratio of the chemical agent to the refuse by weight may be varied over rather wide limits, but for most purposes it will be found to be about 1:50 by weight, based upon the solids content of the waste, although ratios from as low as about 1:45 to about 1:55 are also generally satisfactory.

The chemical agent which is employed for bringing about this desired suspension or solubilization of the above-mentioned waste starch adhesives components preferably consists essentially of cyclohexylamine, and alkyl phenyl polyethylene glycol ether such as the Union Carbide product known in the trade as "Tergitol N-14," and tetrakis (2-hydroxy-propyl) ethylene diamine. The weight ratios of these three ingredients preferably are about 34,000:1:1 respectively although these ratios may be varied over fairly wide ranges. For example, these ratios may be varied from as low as about 30,000:1:1 to as high as about 40,000:1:1 without departing from the spirit of the invention.

The foregoing chemical agent is added to the starch refuse in a treatment tank or well according to a predetermined flow rate as governed by the requirements of the plant to which the disposal system is an adjunct. This addition results in a suspension and/or solubilization of the starch and other waste residue solids, with even distribution throughout, making it possible to dispose of the resulting homogeneous or substantially homogeneous suspension or dispersion very conveniently in the normal sewage disposal system about the plant. For example, for a system normally resulting in 50 pounds per day of starch adhesive waste material, it is found that about 525 milliliters per day of the above chemical agent composition added to the waste material is adequate to create the necessary suspension and/or solution, although quantities as low as about 450 milliliters and as high as about 600 milliliters per day may be employed.

While the chemical agent to be added to bring about the desired suspension or solubilization action as set forth above is disclosed as one having three components, it is possible under certain circumstances to employ the cyclohexylamine with either of the other two components, although generally speaking it is preferred to use the combination of all three. In general, when the pH of the waste slurry undergoing treatment lies between about 6.0 and 8.0 the process of the present invention may be practiced omitting either the alkyl phenyl polyethylene glycol ether or the tetrakis (2-hydroxy-propyl) ethylene diamine, although the results may not be quite so effective or the process quite so efficient. Otherwise, all three components should be present in the treating agent.

The alkyl phenyl polyethylene glycol ether component is a mixture of relatively high molecular weight compounds in which the alkyl substituents on the phenyl radical have an average molecular weight corresponding to a $C_9$ alkyl radical, although average molecular weights corresponding from $C_6$ to $C_{18}$ alkyl substituents are satisfactory. Moreover, the ethoxy repeating unit in the side chain corresponds to an average of from about 4 to 8 of such units, although compounds having a greater number of repeating units may also be employed if desired. Particularly desirable results are obtained when this component of the treating agent has an average molecular weight in the range of about 385 to 445.

Figure 2:
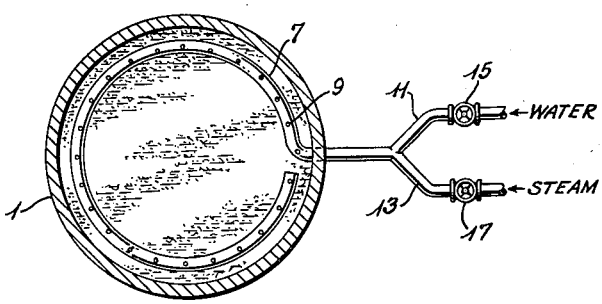

While the manner of addition of the chemical agent as set forth above to the starch refuse composition may be varied widely, it has been discovered that a particularly desirable way of carrying out the addition is as shown by reference to the accompanying drawing where FIGURE 1 shows apparatus in somewhat diagrammatic fashion, being a vertical longitudinal section; and FIGURE 2 is a horizontal cross-section taken along the line 2—2 of FIGURE 1.

Referring now to FIGURE 1, the apparatus consists of a treatment tank or well 1 which may be of any suitable material, such as concrete, steel or brick. For a rated capacity of handling 50 pounds per day of waste residue it is found that a tank 3 ft. deep by 2 ft. in diameter is adequate. For other capacities of course the dimensions and ratios of treating agent will be modified accordingly.

An inlet pipe 3 is provided for introducing waste residue from the corrugating or other starch adhesive composition utilization machine in the plant proper. This inlet pipe preferably extends downwardly to about 6" from the bottom of the tank 1, thereby helping to trap oils, grease and other liquid debris from the plant and minimizing the necessity for agitation. A discharge pipe 5 is provided for removing the treated material from the tank and discharging it to the sewer or other waste. This pipe also extends to within about 6" of the bottom of tank 1. Disposed in the lowermost part of the tank is a ring-shaped pipe 7 having numerous perforations 9 through which, if desired, various fluids may be introduced into the tank 1. Pipe 7 communicates with branches 11 and 13 (FIGURE 2) by means of which fluids such as water and live steam, respectively, may be introduced into the tank 1. Control valves 15 and 17 are provided for controlling the rate of input of fluids thus introduced.

In operation the tank will become filled with waste starch adhesive composition up to about the level of 19 (FIGURE 1) whereupon, after having added thereto the chemical treating agent as set forth above, and with or without agitation by fluids via pipe 7, the suspended or solubilized waste materials will be discharged by pipe 5 and a pump (not shown) to suitable disposal such as a sewer or the like. The chemical treating agent may be added continuously or intermittently, as desired, directly to the tank 1.

By way of illustration of starch adhesive compositions to the waste residues of which the present invention is particularly applicable, there may be mentioned a normal Single Face starch adhesive composition for the manufacture of corrugated cardboard boxes consisting of a mixture of pearl starch (1.82 lbs. per gallon), caustic soda (0.045 lb. per gallon) and 5 mol percent borax solution (0.039 lb. borax per gallon). For more rugged uses, such as where the boxes are intended for overseas shipments and the like, one may make use of a weather-proof starch adhesive composition consisting of a mixture of a starch-resorcinol reaction product (0.43 lb. per gallon), formaldehyde (0.195 lb. per gallon in the form of a 37% solution), and caustic soda (0.0285 lb. per gallon).

At the end of the manufacturing shift, the corrugators and refuse troughs are flushed down in the normal fashion with the refuse starch and other liquid debris flowing into the treatment tank which allows the water to run off and the starch to settle after which from about 450 to 600 milliliters of additive or treating agent are placed in the tank. The actual weight of starch adhesive refuse from three corrugators will amount to about 40 to 60 pounds. This procedure is repeated at suitable intervals, such as every twenty-four hours, with ultimate overflow from the pit to the drainage system, carrying suspended and dissolved starch refuse through the sewage system of the plant.

It will be apparent from the foregoing description that the present invention provides a desirable method and composition for effecting an extremely efficient and labor-saving mode of handling the heretofore disagreeable waste disposal problem connected with the use of conventional or other starch adhesive compositions. Moreover it provides a way of handling these materials at a minimum of cost and difficulty while avoiding the annoyance of discharging into streams extremely malodorous substances such as might be destructive of marine plant and animal life, and therefore commends itself to those who have occasion to employ starch adhesive compositions in connection with their industrial operations.

While specific examples of preferred methods and compositions embodying the present invention have been described above, it will be apparent that many changes and modifications may be made therein without departing from the spirit of the invention. It will therefore be understood that the particular compositions and methods of procedure set forth above are intended to be illustrative only and are not intended to limit the invention.

What is claimed is:

1. A method for disposing of sludgelike waste starch residues comprising mixing said residues with a treating composition comprising cyclohexylamine, an alkyl phenyl polyethylene glycol ether, and tetrakis (2-hydroxy-propyl) ethylene diamine in order to disperse components of the sludgelike residues therein and running the resulting mixture to waste in the normal sewage system of an industrial plant.

2. In the manufacture of corrugated board and boxes by methods involving the use of starch compositions for adhesive purposes wherein sludgelike waste starch residues are obtained that are difficult to dispose of in the normal sewage system of an industrial plant, the improvement comprising the step of treating such waste starch residues with a solubilizing and suspending agent comprising cyclohexylamine, an alkyl phenyl polyethylene glycol ether and tetrakis (2-hydroxy-propyl) ethylene diamine.

3. In the manufacture of corrugated board and boxes by methods involving the use of starch compositions for adhesive purposes wherein sludgelike waste starch residues are obtained that are difficult to dispose of in the normal sewage system of an industrial plant, the improvement comprising the step of treating such waste starch residues with a solubilizing and suspending treating agent comprising cyclohexylamine, an alkyl phenyl polyethylene glycol ether, and tetrakis (2-hydroxy-propyl) ethylene diamine which are present in the treating agent in the respective weight ratios of about 30,000 to 40,000:1:1.

4. A method as defined in claim 3, in which the treating agent is employed in the ratio of about 1:45 to 55 by weight, based on the solids content of the waste starch residues.

5. A method as defined in claim 3, in which the treating agent is employed in the ratio of about 1:50 by weight, based on the solids content of the waste starch residue, and in which the three components of the treating agent are present in the ratio of about 34,000:1:1 by weight.

6. A solubilizing and suspending agent for treating sludgelike waste starch residues comprising cyclohexylamine, an alkyl phenyl polyethylene glycol ether, and tetrakis (2-hydroxy-propyl) ethylene diamine.

7. A composition as defined in claim 6, in which the three named compounds are present in the respective weight ratio of about 30,000 to 40,000:1:1.

8. A composition as defined in claim 6, in which the three named compounds are present in the respective weight ratio of about 34,000:1:1.

9. A composition as defined in claim 6, in which the alkyl group of the ether component has a carbon atom content of 6 to 18.

10. A composition as defined in claim 6, in which the alkyl group of the ether component corresponds to an average carbon atom content of about 9.

References Cited in the file of this patent

UNITED STATES PATENTS

| | | |
|---|---|---|
| 2,317,752 | Fuller | Apr. 27, 1943 |
| 2,336,778 | Costa et al. | Dec. 14, 1943 |
| 2,584,123 | Gruenwald | Feb. 5, 1952 |
| 2,611,485 | Tveter | Sept. 23, 1952 |
| 2,865,854 | Sweet | Dec. 23, 1958 |

OTHER REFERENCES

Kerr: "Chemistry and Industry of Starch," publ. by Academic Press (N.Y.), 1944, page 57 relied upon.